(12) United States Patent
Beyer et al.

(10) Patent No.: US 8,371,254 B2
(45) Date of Patent: Feb. 12, 2013

(54) FUEL INJECTOR COOLING

(75) Inventors: Ted Beyer, Canton, MI (US); John Christopher Riegger, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 401 days.

(21) Appl. No.: 12/850,384

(22) Filed: Aug. 4, 2010

(65) Prior Publication Data

US 2012/0031354 A1 Feb. 9, 2012

(51) Int. Cl.
*F01P 1/06* (2006.01)
(52) U.S. Cl. .............. 123/41.31; 123/41.82 R
(58) Field of Classification Search .......... 123/41.31, 123/41.79, 41.82 R, 193.5, 195 R, 541
See application file for complete search history.

(56) References Cited

U.S. PATENT DOCUMENTS

| | | | |
|---|---|---|---|
| 4,267,977 | A | 5/1981 | Stockner et al. |
| 4,683,844 | A | 8/1987 | Arai et al. |
| 5,370,309 | A | 12/1994 | Strelbisky et al. |
| 5,860,394 | A | 1/1999 | Saito et al. |
| 6,976,683 | B2 | 12/2005 | Eckert et al. |
| 7,249,578 | B2 | 7/2007 | Fricke et al. |
| 2006/0124765 | A1 | 6/2006 | Kothen et al. |

FOREIGN PATENT DOCUMENTS

GB 720916 12/1954

*Primary Examiner* — Noah Kamen
(74) *Attorney, Agent, or Firm* — Julia Voutyras; Alleman Hall McCoy Russell & Tuttle LLP

(57) ABSTRACT

Systems and methods for cooling a fuel injector of a direct injection engine are disclosed. In order to route coolant directly beneath a fuel injector adjacent to a combustion chamber in a direct injection engine, a recess is cast beneath the injector and a slotted gasket is provided to route coolant from core prints of the exiting water jacket into the recess beneath the injector.

20 Claims, 6 Drawing Sheets

FUEL INJECTOR COOLING

FIELD

The present application relates to fuel injector cooling.

BACKGROUND AND SUMMARY

Internal combustion engines may be cooled by circulating a suitable coolant through various passages or cavities in the engine.

In direct injection engines, approaches are known which route coolant over the fuel injectors where it is simple to package. However, many direct injection engines have been developed without cooling under the fuel injectors near the combustion chambers. Heat from the combustion chamber will make these regions hot. Packaging coolant in the form of a traditional water jacket core may not be possible.

In some approaches, sand core may be packaged beneath the injector to create coolant cavities. However, due to wall and sand thickness requirements, the resulting water flow may be far from the combustion chamber reducing the effectiveness of the cooling. Further, such sand cores may be large and difficult to produce. In such approaches, additional metal and sand cores employed to route coolant near hot regions of a fuel injector (e.g. adjacent to the combustion chamber) may result in an increase in material and construction costs and may require modification to existing components in the engine block. Such approaches may lead to higher costs, less effective cooling, and additional weight, for example.

In order to at least partially address these issues, in one example approach a direct injection engine is provided. The direct injection engine, comprises: a first and a second coolant passage each traversing from a cylinder block to a cylinder head; an angled fuel injector bore in the head; a recess positioned between the first and second coolant passages, the recess being depressed in the head toward the injector bore; and a head gasket having a slot fluidically coupling the first and second passages with the recess.

In this way, coolant may be routed beneath a direct injector near a combustion chamber resulting in an increase in cooling of the injector. Further, in such an approach, the injector may be cooled with a minimal amount of additional features, e.g., without additional metal parts or sand cores in the engine block, thus reducing costs associated with manufacturing and installation of new components, if desired.

Further, by routing coolant beneath an injector bore in this way, a relatively smaller amount of coolant (e.g., as compared with an amount of coolant flowing in the first and second coolant passages) may be utilized to cool a fuel injector. A pressure differential between the first and second coolant passages may cause a relatively small amount of coolant to "leak" into the recess beneath the injector bore. The relatively small amount of coolant delivered beneath the injector bore may be sufficient to reduce temperatures of a fuel injector installed therein.

Additionally, an amount of injector cooling may be adjusted, e.g., by adjusting a size and/or shape of the slots in the gasket. Further, casting weight may be reduced, e.g., via the recesses formed in the cylinder head. Further still, increasing injector cooling may contribute to a more durable system and may lower fuel temperatures which may result in engine performance benefits.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
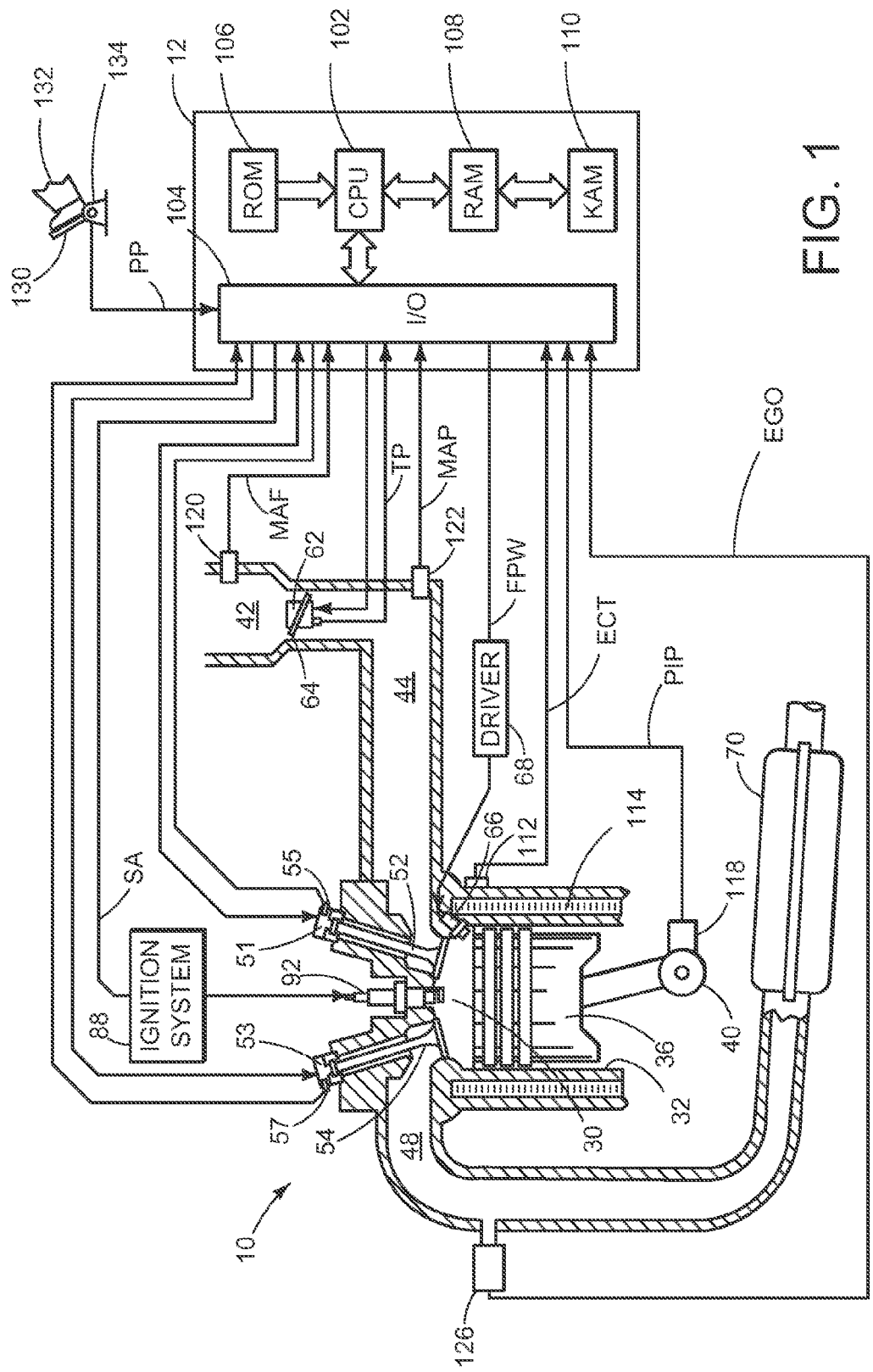
FIG. 1 shows an example direct injection engine.

The following description relates to systems and methods for cooling a fuel injector of a direct injection engine, such as in the example engine shown in FIG. 1.

In order to route coolant directly beneath a fuel injector adjacent to a combustion chamber in a direct injection engine, a recess may be cast beneath the injector and a slotted gasket may be provided to route coolant from core prints of an existing water jacket into the recess beneath the injector, such as shown in FIGS. 2-6.

Routing coolant directly beneath a fuel injector in this way may result in an increase in cooling of the injector. Further, in such an approach, the injector may be cooled with a minimal amount of additional features, e.g., without additional metal parts or sand cores in the engine block, thus reducing costs associated with manufacturing and installation of new components.

Additionally, an amount of injector cooling may be adjusted, e.g., by adjusting a size and/or shape of the slots in the gasket. Further, casting weight may be reduced, e.g., via the recesses formed in the cylinder head. Additionally, increasing injector cooling may contribute to a more durable system and may lower fuel temperatures which may result in engine performance benefits.

Turning now to FIG. 1, a schematic diagram showing one cylinder of multi-cylinder engine 10, which may be included in a propulsion system of an automobile, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and that each cylinder may similarly include its own set of intake/exhaust valves, fuel injector, spark plug, etc.

Figure 2:
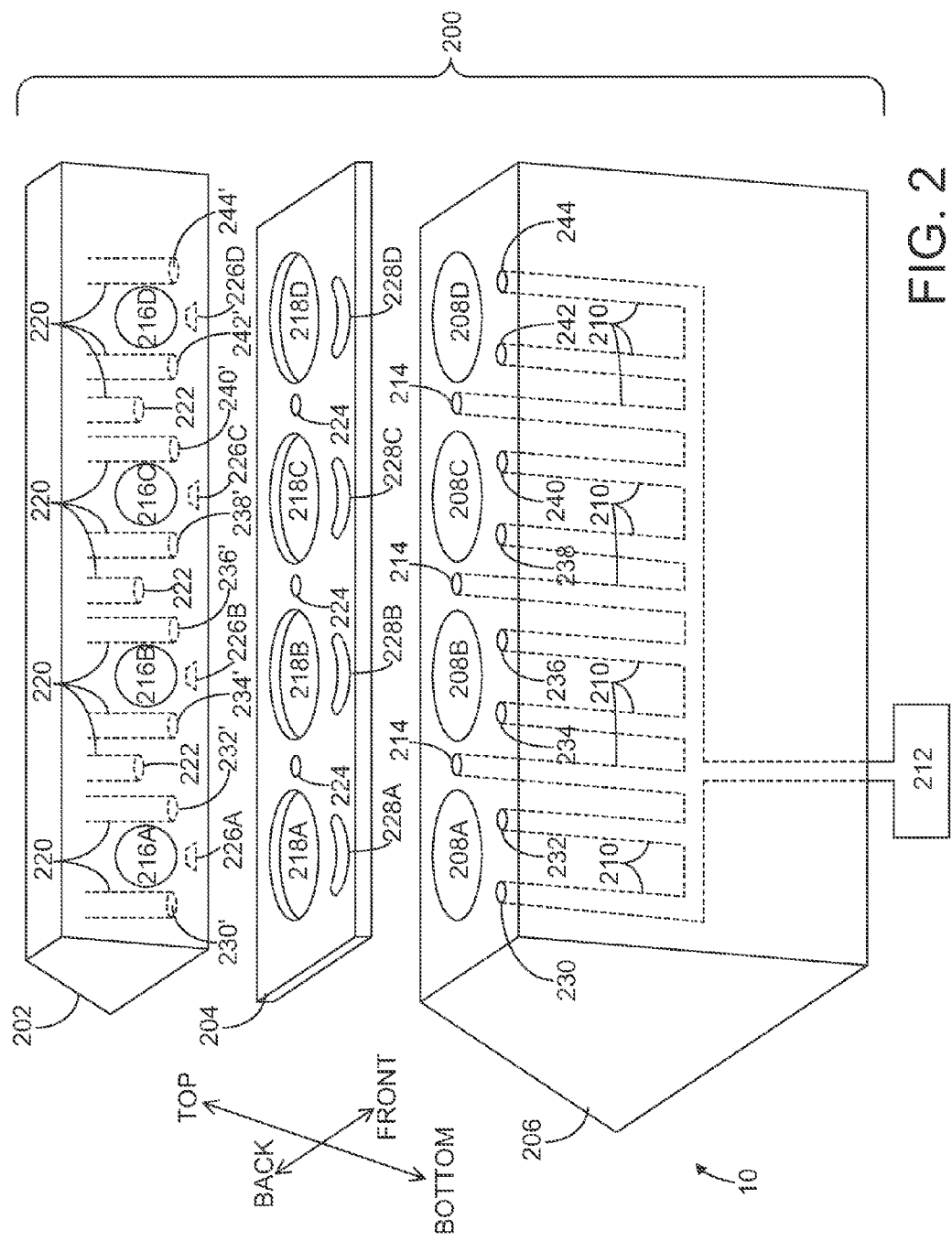
FIGS. 2-6 show various views of an engine with fuel injector cooling features.

FIG. 2 schematically shows an exploded view 200 of an example engine, e.g., engine 10, including a cylinder head 202, a cylinder head gasket 204, and a cylinder block 206. Various components and features of engine 10 are shown in more detail and from various viewpoints in FIGS. 3-6 described below herein.

The cylinder block 206 (or engine block) is a machined casting (or, in some examples, an assembly of modules) containing a plurality of cylindrically bored holes for pistons, e.g. piston 36, of a multi-cylinder reciprocating internal combustion engine. The example engine shown in FIG. 2 includes four cylinders 208A, 208B, 208C, and 208D arranged in an inline-4 configuration. However, it should be understood that though the example in FIG. 2 shows an engine with four cylinders arranged in an inline-4 configuration, any number of cylinders and other cylinder configurations may be used.

Cylinder head 202 sits above the cylinders on top of cylinder block 206. Head 202 comprises a platform containing part of each combustion chamber, and various other engine components such as poppet valves and spark plugs. Cylinder head 202 also includes a plurality of injector bores for receiving injectors to supply fuel to the cylinders. For example, as shown in FIG. 2, cylinder head 202 includes injector bores 216A, 216B, 216C, and 216D for receiving fuel injectors to supply fuel to cylinders 208A, 208B, 208C, and 208D, respectively. Each injector bore may be positioned adjacent to a front side of a corresponding cylinder, and centrally positioned above said corresponding cylinder.

Head gasket 204 is positioned between cylinder block 206 and cylinder head 202. Gasket 204 mates with the cylinder head and functions to seal the cylinders and reduce coolant leakage. Gasket 204 includes a plurality of cylinder apertures, one for each cylinder in the engine. Each cylinder aperture in gasket 204 is substantially the same size and shape as a cylinder in cylinder block 206. When gasket 204 is in an installed position on top of cylinder block 206, each cylinder aperture in gasket 204 is aligned with a corresponding cylinder in cylinder block 206. For example, as shown in FIG. 2, gasket 204 includes cylinder apertures 218A, 218B, 218C, and 218D corresponding to cylinders 208A, 208B, 208C, and 208D, respectively.

Engine 10 includes a plurality of coolant passages or coolant cavities therein. Such coolant cavities or passages may be produced using sand cores during a casting process, for example. In particular, cylinder block 206 includes a plurality of coolant passages or cavities 210 therein for delivery of coolant from a coolant source 212. Coolant from coolant source 212 may be circulated through the coolant cavities 210 to cool regions of the engine.

A plurality of coolant apertures may be positioned on a top surface of cylinder block 206. The plurality of coolant apertures in the top surface of cylinder block 206 may assist in delivery of coolant to other engine components. For example, the plurality of coolant apertures in the top surface of cylinder block 206 may be coupled to a plurality of coolant cavities 220 in cylinder head 202 via a plurality of coolant apertures on the bottom side of cylinder head 202.

For example, a direct engine may include a first and second coolant passage each traversing from a cylinder block to a cylinder head. Namely, the cylinder block may have a first and second coolant passage each having openings; and the cylinder head may have a first and second coolant passage each having openings. Further, the first and a second coolant passages traversing from the cylinder block to the cylinder head may include apertures in the cylinder block and apertures in the cylinder head. In some examples, the apertures in the cylinder block may be smaller than and fully overlapped by the apertures in the cylinder head.

By way of example, FIG. 2 shows a plurality of coolant apertures 214, 230, 232, 234, 236, 238, 240, 242, and 244 in the top surface of cylinder block 206 positioned adjacent to perimeters of the cylinders. Coolant apertures 214, 230, 232, 234, 236, 238, 240, 242, and 244 may be fluidically coupled to corresponding apertures 222, 230', 232', 234', 236', 238', 240', 242', and 244', respectively, in the bottom of cylinder head 202 so that coolant may circulate throughout the engine.

The coolant apertures in the top of the cylinder block may transfer coolant to coolant passages in the cylinder head via a plurality of transfer features in gasket 204. The transfer features may be apertures in the gasket extending therethrough allowing coolant to pass through the gasket from the coolant passages in the cylinder block to the coolant passages in the cylinder head or vice versa. For example, as shown in FIG. 2, gasket 204 includes transfer features 224 which put coolant apertures 222 in cylinder head 202 in fluid communication with coolant apertures 214 in cylinder block 206. It should be understood that the example coolant passages, apertures, and transfer features shown in FIG. 2 are exemplary in nature and engine 10 may include various coolant passages, coolant apertures, and coolant transfer features not shown in FIG. 2.

Since the injector bores in the cylinder head would obstruct coolant passages extending from the cylinder block to the cylinder head, no coolant apertures are positioned directly beneath the fuel injector bores 216. Instead, in some examples, coolant apertures and coolant passages may flank regions of the engine adjacent to the sides and/or tops of the injector bores.

In order to cool regions of the engine adjacent to and beneath the injectors, e.g., to cool regions of the injectors adjacent to the combustion chambers, recesses or pockets are cast into the bottom of the cylinder head, beneath each injector bore. Each recess or pocket may project upward from the bottom of the cylinder head toward a bottom sloping surface of the fuel injector bore, e.g., the recess may be depressed toward the injector bore, so that coolant may be routed closer to the injector bore. Further, a recess may be positioned between first and second coolant passages traversing from the cylinder block to the cylinder head. For example, as shown in FIG. 2, pockets 226A, 226B, 226C, and 226D are positioned beneath injector bores 216A, 216B, 216C, and 216D, respectively. Each pocket is flanked by coolant apertures in the cylinder head, e.g., pocket 226A is shown flanked by coolant apertures 230' and 232' in FIG. 2.

A plurality of transfer features or slots are formed in the gasket adjacent to the front of each cylinder directly beneath each injector bore. Each slot positioned beneath a corresponding injector bore is sized and/or shaped to at least partially overlap coolant apertures in the cylinder block and cylinder head adjacent to the corresponding injector bore. In some examples, such a slot may only partially overlap the coolant passages and fully overlap the recess. Each slot fluidically couples first and second coolant passages with a corresponding recess in the cylinder head. Namely, the slots in the gasket extend all the way through the gasket and provide fluidic communication with core prints of the existing water jacket, namely coolant passages 210 in the cylinder block and coolant passages 220 in the cylinder head, so that coolant may flow upward through the slots of the gasket into the recesses of the cylinder head and downward through the slot of the gasket.

For example, as shown in FIG. 2, slots 228A, 228B, 228C, and 228D are formed in gasket 204 in front of and adjacent to cylinder apertures 218A, 218B, 218C, and 218D, respectively. Each slot in the gasket at least partially overlaps coolant apertures in the cylinder head and coolant apertures in the cylinder block. For example, slot 228A at least partially overlaps coolant apertures 230 and 232 in the cylinder block and coolant apertures 230' and 232' in the cylinder head so that coolant may flow upward through the slot 228A of the gasket into pocket 226A in the cylinder head and downward through the slot 228A of the gasket via the coolant apertures in the cylinder block and head.

Figure 3:
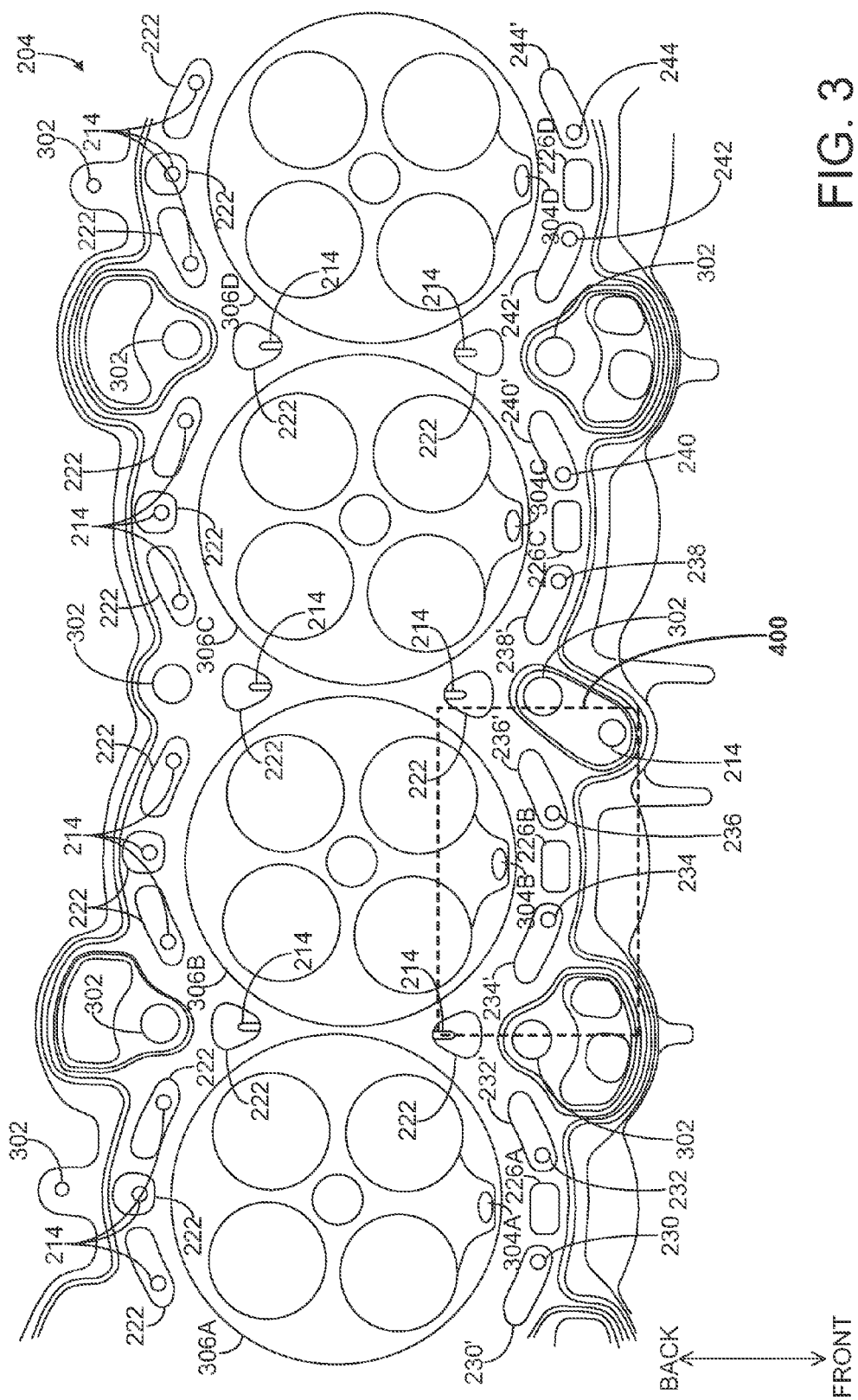

FIG. 3 shows a partial bottom view of cylinder head 204. The various components and configurations of components are shown approximately to scale in FIG. 3.

Cylinder head 204 includes a plurality of mechanical coupling features 302 for coupling various engine components together e.g., for coupling the cylinder head to the cylinder gasket and block, e.g., via nuts, bolts, welding or the like.

Figure 6:
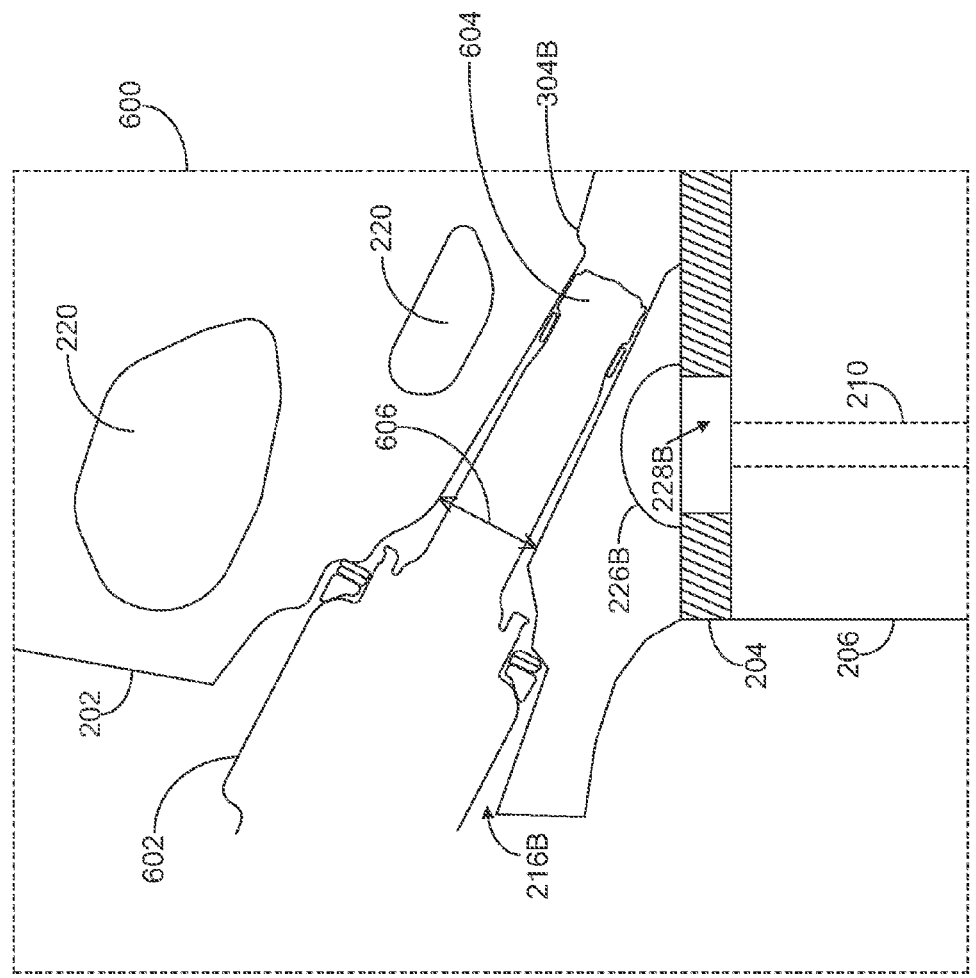

Each cylinder in the engine (e.g., cylinders 208A, 208B, 208C, and 208D) has a corresponding cylinder cavity in the cylinder head. For example, as shown in FIG. 3, cylinder head 204 includes cylinder cavities 306A, 306B, 306C, and 306D corresponding to cylinders 208A, 208B, 208C, and 208D, respectively. Each cylinder cavity contains part of each corresponding combustion chamber, and includes various other engine components such as poppet valves, spark plugs, and injector apertures. For example, cylinder cavities 306A, 306B, 306C, and 306D include injector apertures 304A, 304B, 304C, 304D, respectively, for directing fuel from fuel injectors into the combustions chambers. The injector apertures may be coupled to a respective injector bore (e.g., injector apertures 304A, 304B, 304C, 304D may be coupled to injector bores 216A, 216B, 216C, and 216D, respectively) as shown in FIG. 6 described below herein.

FIG. 3 shows an example positioning of the plurality of coolant apertures 214, 230, 232, 234, 236, 238, 240, 242, and 244 in the top surface of the cylinder block positioned adjacent to perimeters of the cylinders. The coolant apertures 214, 230, 232, 234, 236, 238, 240, 242, and 244 mate with corresponding apertures 222, 230', 232', 234', 236', 238', 240', 242', and 244', respectively, in the bottom of cylinder head 202 so that coolant may flow between each aperture in the head and the corresponding aperture in the cylinder block via a corresponding transfer feature in the head gasket.

Figure 4:
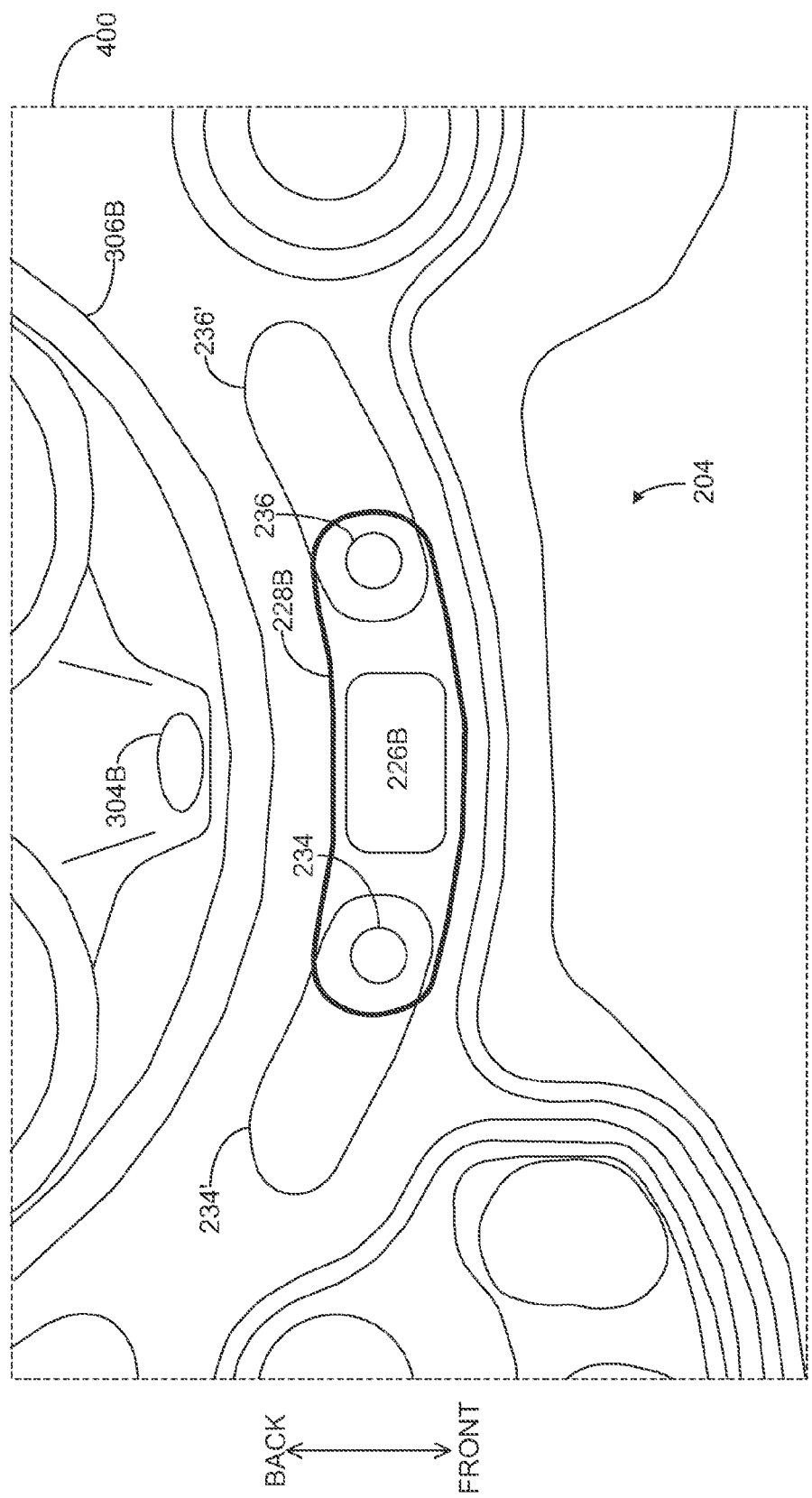

FIG. 4 shows a close-up bottom view of a region 400 cylinder head 204. The region 400 shown in FIG. 4 is a region of cylinder head 204 adjacent to injector aperture 304B in cylinder cavity 306B. Region 400 is indicated approximately in FIG. 3 by a dashed box. The various components and configurations of components are shown approximately to scale in FIG. 4.

An example recess 226B in the cylinder head beneath the injector bore 216B is shown in FIG. 4 flanked by a first coolant aperture 234' in the bottom of cylinder head 204 and a second coolant aperture 236' in the bottom of cylinder head 204.

An example slot 228B in the cylinder gasket is also shown in FIG. 4. Slot 228 overlaps at least a portion of coolant apertures 234' and 236' in cylinder head 204 and at least a portion of coolant apertures 234 and 236 in the top surface of the cylinder block. Further, slot 228B at least partially overlaps recess 226B so that coolant may flow upward through slot 228B of the gasket into recess 226B of the cylinder head and downward through slot 228B of the gasket.

Slot 228B may have a variety of shapes and sizes. In some examples, a radius of curvature of the slot may be substantially equal to a radius of curvature of the combustion chamber. Further, the shape and/or size of the slot may be adjusted to vary an amount of coolant flow entering into recess 226B. For example, the size of the slot may be increased or the shape of the slot may be changed to increase an amount of overlap with one or more of the coolant apertures in the cylinder head or cylinder block which may result in an increase in coolant flow into the recess beneath the fuel injector. Increasing coolant flow to the recess may result in an increase in cooling of the fuel injector. Similarly, the size of the slot may be decreased or the shape of the slot may be changed to decrease an amount of overlap with one or more of the coolant apertures in the cylinder head or cylinder block which may result in a decrease in coolant flow into the recess beneath the fuel injector. Decreasing coolant flow to the recess may result in a decrease in cooling of the fuel injector. Further, in some examples, the shape and/or size of the slot may be predetermined based on a desired amount of coolant flowing into the recess and/or based on a shape or size of the recess.

Figure 5:
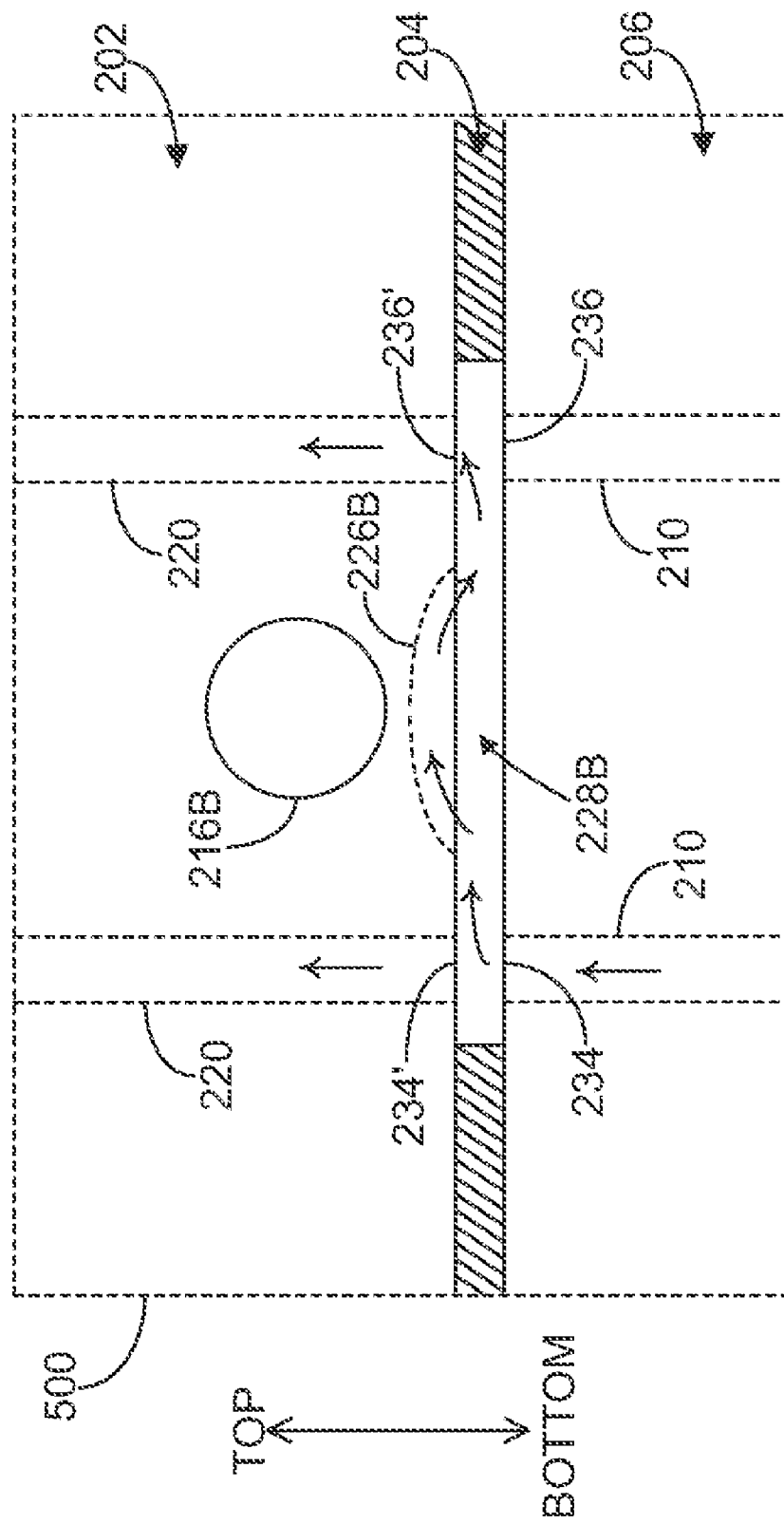

FIG. 5 schematically shows a front view 500 of a region of engine 10 adjacent to an injector bore 216 in cylinder head 202. Coolant may flow through coolant cavities in the cylinder head, cylinder block, and cylinder gasket in a variety of ways. One example direction of coolant flow is indicated in FIG. 5 by arrows. In this example, coolant flows up from cylinder block 206 through aperture 234, through slot 228B and up through aperture 234' into cylinder head 202. An amount of coolant (e.g., a coolant pressure in cavity 210) flowing from cylinder block 206 through aperture 236 may be less than the amount of coolant flowing through aperture 234. In some examples, under certain conditions, the amount of coolant flowing through aperture 236 may be substantially zero. In this example, this difference in the amount of coolant flow is created by a pressure differential between the coolant paths flanking recess 226B and drives coolant to flow into slot 228B from aperture 23, up into recess 226B, and through aperture 236' into cylinder head 202. It should be understood that the coolant flow path shown in FIG. 5 is exemplary in nature and other flow paths may be used with different pressure differentials to drive coolant flow into recess 226B. Namely, coolant may be delivered to the recess by various coolant flow paths including a first flow path in fluid communication with the slot with a first pressure and a second flow path in fluid communication with the slot with a second pressure less than the first pressure. In this way, coolant flowing between the cylinder block and cylinder head includes a pressure drop in the recess which drives a portion of the coolant into the recess beneath the fuel injector.

FIG. 6 shows a side view 600 of a region of engine 200 adjacent an injector bore 216B in cylinder head 202. A fuel injector 602 is shown in an installed position in injector bore 216B. Injector bore 216B slopes downwards toward cylinder block 206 so that a tip portion 604 of injector 602 points downward and towards injector aperture 304B to supply fuel to combustion chamber 208B. Namely, a central axis of the injector bore is sloped downward toward the combustion chamber. Additionally, a diameter 606 of the fuel injector bore may decrease in a direction toward the combustion chamber.

Example coolant cavities or passages 220 are shown in cylinder head 202 above fuel injector 602, e.g., as formed using sand cores. Coolant may flow through coolant cavities 220 in cylinder head 202 and through coolant passages 210 in cylinder block 206.

Gasket 204 with slot 228B therein provides fluid communication between at least one coolant passage in the cylinder block, at least one coolant passage in the cylinder head, and recess 226B in the cylinder head beneath injector 216. Recess 226 is positioned adjacent to tip portion 604 of injector 602 to provide cooling to regions of the injector adjacent to the combustion chamber.

Routing coolant directly beneath a fuel injector in this way may result in an increase in cooling of the injector. Further, in such an approach, the injector may be cooled with a minimal amount of additional features, e.g., without additional metal parts or sand cores in the engine block, thus reducing costs associated with manufacturing and installation of new components.

Additionally, an amount of injector cooling may be adjusted, e.g., by adjusting a size and/or shape of the slots in the gasket. Further, casting weight may be reduced, e.g., via the recesses formed in the cylinder head. Additionally, increasing injector cooling may contribute to a more durable system and may lower fuel temperatures which may result in engine performance benefits.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first"

element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A direct injection engine, comprising:
   a first and a second coolant passage each traversing from a cylinder block to a cylinder head;
   an angled fuel injector bore in the head;
   a recess positioned between the first and second coolant passages, the recess being depressed in the head toward the injector bore; and
   a head gasket having a slot fluidically coupling the first and second passages with the recess.

2. The engine of claim 1, wherein the slot only partially overlaps the first and second coolant passages, and fully overlaps the recess.

3. The engine of claim 1, wherein the recess is cast in the cylinder head adjacent to the fuel injector bore and a cylinder in the cylinder block.

4. The engine of claim 1, wherein a diameter of the fuel injector bore decreases in a direction toward a cylinder in the cylinder block and a central axis of the angled injector bore is sloped downward toward the cylinder.

5. The engine of claim 1, wherein the first and second coolant passages are adjacent to a perimeter of a cylinder in the cylinder block.

6. The engine of claim 1, wherein the slot has a radius of curvature substantially equal to a radius of curvature of a cylinder in the cylinder block.

7. The engine of claim 1, wherein the slot is shaped and sized to provide sufficient cooling flow for the injector.

8. The engine of claim 1, wherein the first and a second coolant passages traversing from the cylinder block to the cylinder head include apertures in the cylinder block and apertures in the cylinder head, the apertures in the cylinder block smaller than and fully overlapped by the apertures in the cylinder head.

9. A system for cooling a fuel injector of a direct injection engine, comprising:
   a cylinder block having a first and second coolant passage each having openings;
   a cylinder head having a first and second coolant passage each with openings communicating with the opening of the block, and having an angled fuel injector bore;
   a recess at an interface between the head and block and between the first and second coolant passages of the block and head, the recess being depressed toward the injector bore; and
   a head gasket having a slot fluidically coupling the openings of the first and second passages of the block and head with the recess.

10. The system of claim 9, wherein the slot overlaps the openings in the first and second coolant passages in the cylinder block, the openings in the first and second coolant passages in the cylinder head, and the recess.

11. The system of claim 9, wherein the slot only partially overlaps the openings in the first and second coolant passages in the cylinder block and the openings in the first and second coolant passages in the cylinder head, and fully overlaps the recess.

12. The system of claim 9, wherein the recess is cast in the cylinder head adjacent to the fuel injector bore and a cylinder in the cylinder block.

13. The system of claim 9, wherein a diameter of the fuel injector bore decreases in a direction toward a cylinder in the cylinder block and a central axis of the angled injector bore is sloped downward toward the cylinder.

14. The system of claim 9, wherein the first and second coolant passages in the cylinder block are adjacent to a perimeter of a cylinder in the cylinder block.

15. The system of claim 9, wherein the slot has a radius of curvature substantially equal to a radius of curvature of a cylinder in the cylinder block.

16. The system of claim 9, wherein the slot has a predetermined shape and size, the predetermined shape and size based on a desired amount of coolant flowing into the recess.

17. The system of claim 9, wherein the openings in the first and second coolant passages in the cylinder block are smaller than and fully overlapped by the openings in the first and second coolant passages in the cylinder head.

18. A method for cooling a fuel injector of a direct injection engine, comprising:
   directing coolant upward through a slot in a head gasket into a recess in a cylinder head, the recess positioned between first and second coolant passages each traversing from a cylinder block to a cylinder head, the recess being depressed in the head toward an angled injector bore in the head; and
   directing coolant downward through the slot in the gasket.

19. The method of claim 18, wherein an amount of coolant flowing through the first and second coolant passages is less than the amount of coolant directed through the slot.

20. The method of claim 18, wherein the slot only partially overlaps the first and second coolant passages, and fully overlaps the recess, the recess is cast in the cylinder head adjacent to the fuel injector bore and a cylinder in the cylinder block, a diameter of the fuel injector bore decreases in a direction toward a cylinder in the cylinder block, and a central axis of the angled injector bore is sloped downward toward the cylinder.

\* \* \* \* \*